United States Patent
Chang

(10) Patent No.: US 7,267,347 B2
(45) Date of Patent: Sep. 11, 2007

(54) STRUCTURAL ASSEMBLY FOR ELECTRIC SCOOTER

(75) Inventor: Ferretti Chang, Taipei (TW)

(73) Assignee: Chien Ti Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/960,914

(22) Filed: Oct. 12, 2004

(65) Prior Publication Data

US 2006/0076746 A1    Apr. 13, 2006

(51) Int. Cl.
*B62M 1/00* (2006.01)

(52) U.S. Cl. .............................. 280/87.05; 280/87.042; 180/208; 180/65.1

(58) Field of Classification Search ............. 280/87.05, 280/87.041, 87.042, 87.043, 767, 437, 785; 180/13, 19.2, 208, 214, 65.1, 907; 403/321, 403/326, 324, 345
See application file for complete search history.

(56) References Cited

U.S. PATENT DOCUMENTS

| | | | | |
|---|---|---|---|---|
| 4,503,925 A * | 3/1985 | Palmer et al. | ................ | 180/13 |
| 4,750,578 A * | 6/1988 | Brandenfels | ................ | 180/13 |
| 4,947,955 A * | 8/1990 | Hopely, Jr. | ................ | 180/216 |
| 5,036,938 A * | 8/1991 | Blount et al. | ................ | 180/208 |
| 5,074,372 A * | 12/1991 | Schepis | ................ | 180/208 |
| 5,154,251 A * | 10/1992 | Fought | ................ | 180/208 |
| 5,228,533 A * | 7/1993 | Mitchell | ................ | 180/208 |
| 5,307,889 A * | 5/1994 | Bohannan | ................ | 180/13 |
| 5,927,730 A * | 7/1999 | Sattler | ................ | 280/47.131 |
| 6,176,337 B1 * | 1/2001 | McConnell et al. | ........ | 180/208 |
| 6,336,517 B1 * | 1/2002 | Cheng | ................ | 403/321 |
| 6,378,642 B1 * | 4/2002 | Sutton | ................ | 180/208 |
| 6,394,481 B1 * | 5/2002 | Pinlam et al. | ................ | 280/510 |
| 6,896,084 B2 * | 5/2005 | Lo | ................ | 280/767 |

\* cited by examiner

*Primary Examiner*—Hau Phan

(57) ABSTRACT

A structural assembly for electric scooter includes a seat mount and a treadboard support. The structural assembly utilizes hook portions on a connecting plate of the treadboard support to hook onto a stud shaft below a joining plate of the seat mount, and further utilizes embed pieces with compression springs disposed therein to be configured in the connecting plate to embed within fixing holes defined in the joining plate of the seat mount, and thereby complete rapid assemblage of the scooter. Furthermore, a triangular notch is defined in a push plate, and inclined sides of the triangular notch are so configured to function in coordination with inclined edges of wedge-shaped slots formed in upper portion of embed pieces, and thus control of extension or retraction of the embed pieces is effectuated by means of sliding coordination of the inclined sides and the inclined edges.

2 Claims, 7 Drawing Sheets

STRUCTURAL ASSEMBLY FOR ELECTRIC SCOOTER

BACKGROUND OF THE INVENTION (a) Field of the Invention

The present invention relates to a structural assembly for electric scooter, and more particularly to the structural assembly that applies a wedge sliding principle, which thereby enables a treadboard support of the scooter to rapidly hook onto a seat mount assembly.

(b) Description of the Prior Art

Because physical size of a body of a conventional electric scooter is huge, thus space utilization ratio occupied by storage or packaging and boxing is high. Furthermore, structural configuration of the scooter is such that a treadboard and scooter body and a seat are all welded together to form a single unit. Hence, upon a certain structural member malfunctioning or becoming damaged, the entire unit is necessarily sent for repair, which thus increases inconvenience of transportation packaging and maintenance.

Hence, focus of attention of the present invention is the intention to resolve the problem of simplifying disassembly of structural members in order to facilitate maintenance and repair, while simultaneously giving consideration to a necessary requirement for rapid assembly.

SUMMARY OF THE INVENTION

The present invention provides a structural assembly for electric scooter, and which is constructed to comprise a seat mount and a treadboard support, wherewith objective of rapid assembly and disassembly of the electric scooter is achieved.

The structural assembly for electric scooter of the present invention utilizes hook portions on a connecting plate of the treadboard support to hook onto a stud shaft below a joining plate of the seat mount, and further utilizes embed pieces configured in the connecting plate to embed within fixing holes defined in the joining plate of the seat mount, and thereby complete rapid assemblage of the scooter.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
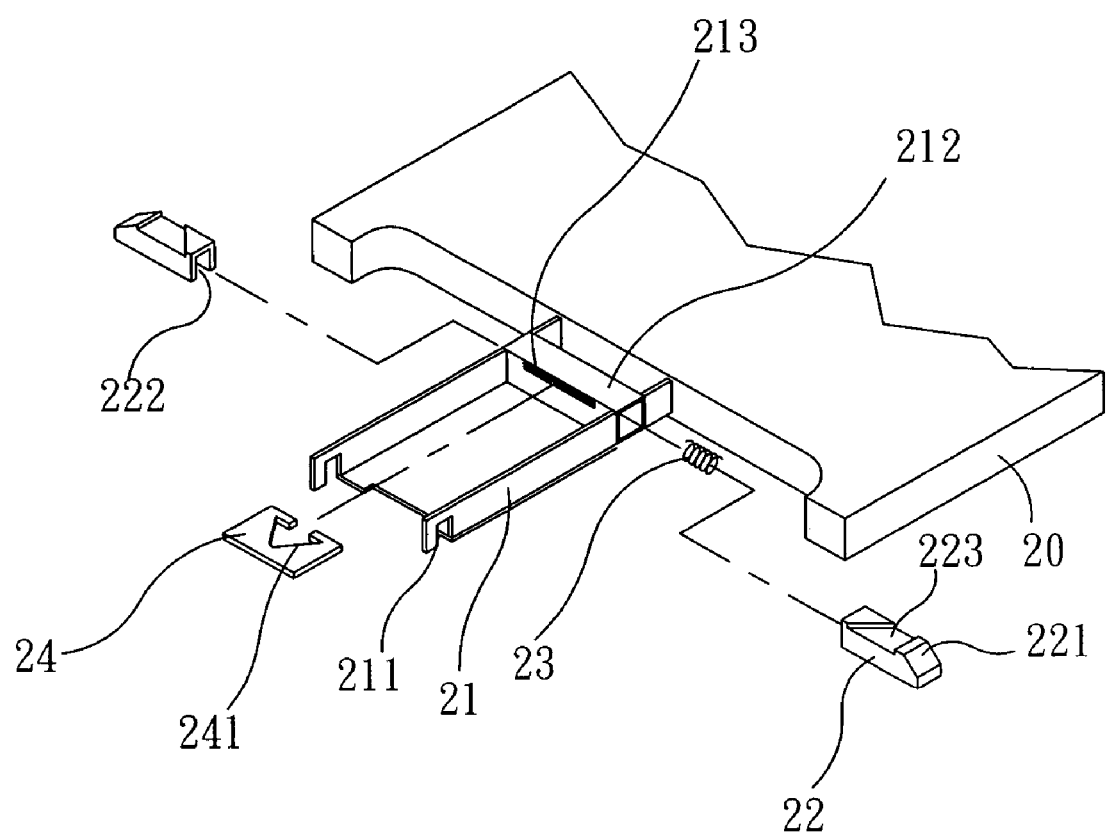
FIG. 1 shows an exploded elevational view according to the present invention.
Figure 2:
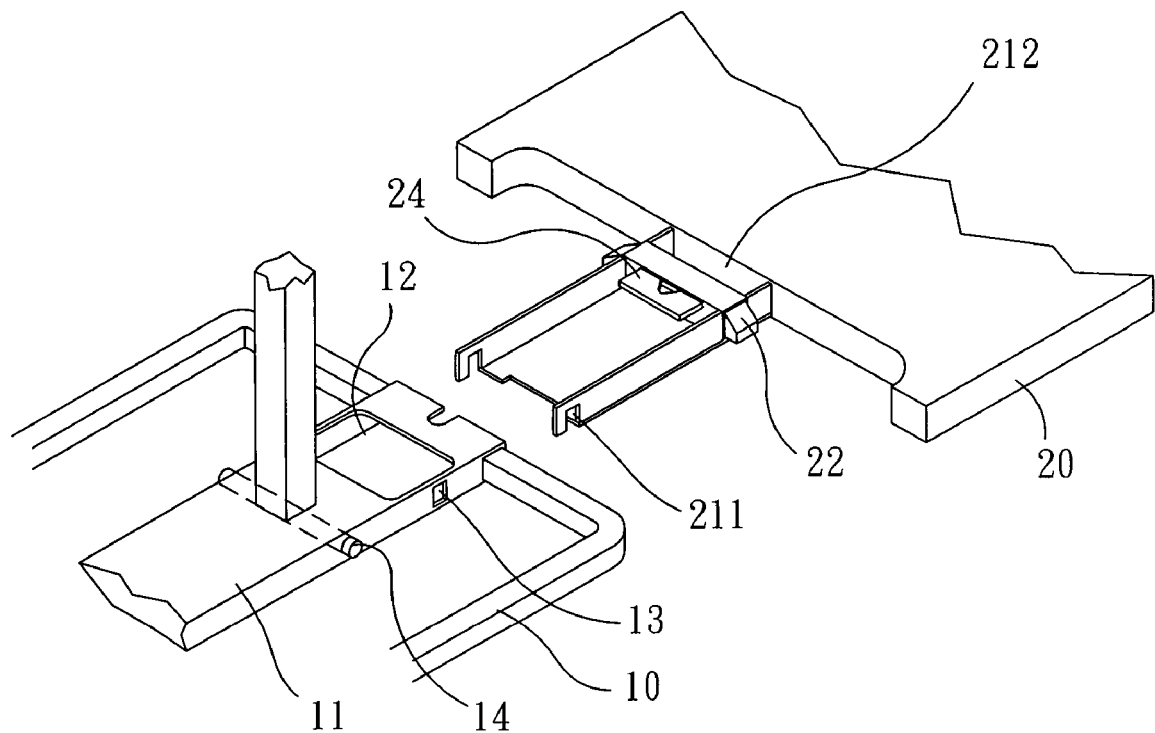
FIG. 2 shows an elevational view depicting assembling of a treadboard support and a seat mount according to the present invention.

Referring to FIGS. 1 and 2, which show an electric scooter of the present invention comprising a seat mount 10 and a treadboard support 20, wherein a joining plate 11 is configured on the seat mount 10. A short slot 12 is defined in a front portion of the joining plate 11, and a fixing hole 13 is defined in each of two sides of the joining plate 11, moreover, a stud shaft 14 penetrates an underneath of the joining plate 11 and is configured thereat. A connecting plate 21 is configured on an extremity of the treadboard support 20, and which is utilized to connectively join with the joining plate 11 of the seat mount 10. Hook portions 211 are configured on a front end of the connecting plate 21, which can hook onto the stud shaft 14 below the joining plate 11 of the seat mount 10. A square duct 212 is configured at a linking end of the connecting plate 21 and the treadboard support 20. A slot 213 penetrates and is thereby defined in one side of the square duct 212. Structural members of the square duct 212 include two embed pieces 22 and one push plate 24. An inclined plane 221 is configuredly formed on one end of each of the embed pieces 22, and a groove 222 is defined in another end, which allows for containment of compression springs 23 therein. Moreover, a wedge-shaped slot 223 is formed in an upper portion of each of the embed pieces 22. Each of the compression springs 23 are correspondingly squeezed into a tail portion of each of the embed pieces 22, and further configured to fit within each end of the square duct 212 of the connecting plate 21. The push plate 24 penetrates within the slot 213 of the square duct 212 of the connecting plate 21. A triangular notch is defined in the push plate 24, and inclined sides of the triangular notch are so configured to function in coordination with inclined edges of the wedge-shaped slots 223 of the embed pieces 22, thus control of extension or retraction of the embed pieces 22 is effectuated by means of sliding coordination of the inclined sides and the inclined edges.

According to the aforementioned assemblage of structural members, the treadboard support 20 can press and thereby control outward extension or inward retraction of the two embed pieces 22 within the square duct 212 by means of the push plate 24, and thereby embedding with or release from the seat mount 10 is effectuated, and thus realizes assembly or disassembly of the scooter.

Figure 3A:
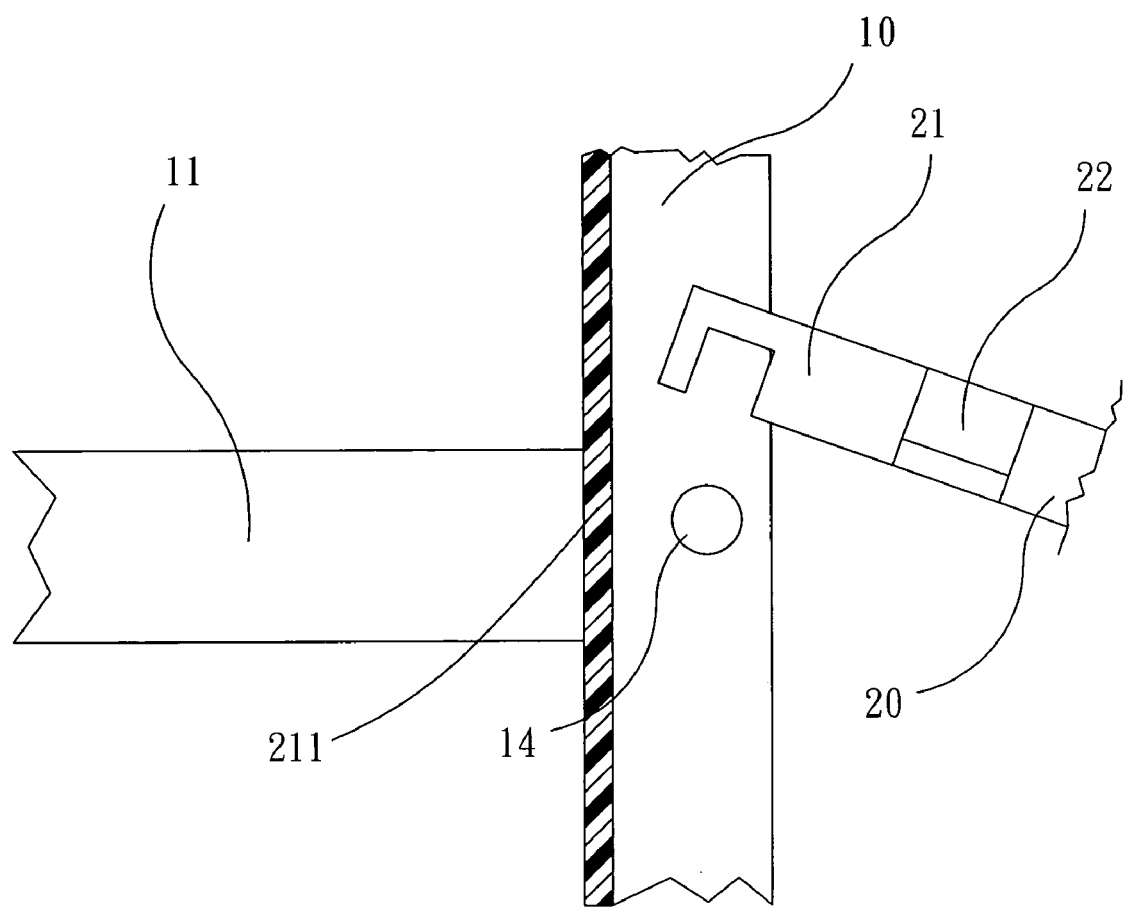
FIGS. 3(A), 3(B), 3(C) show side views depicting motion of hooking assembly of a hook portion of the treadboard support and a stud shaft of the seat mount according to the present invention.
Figure 3B:
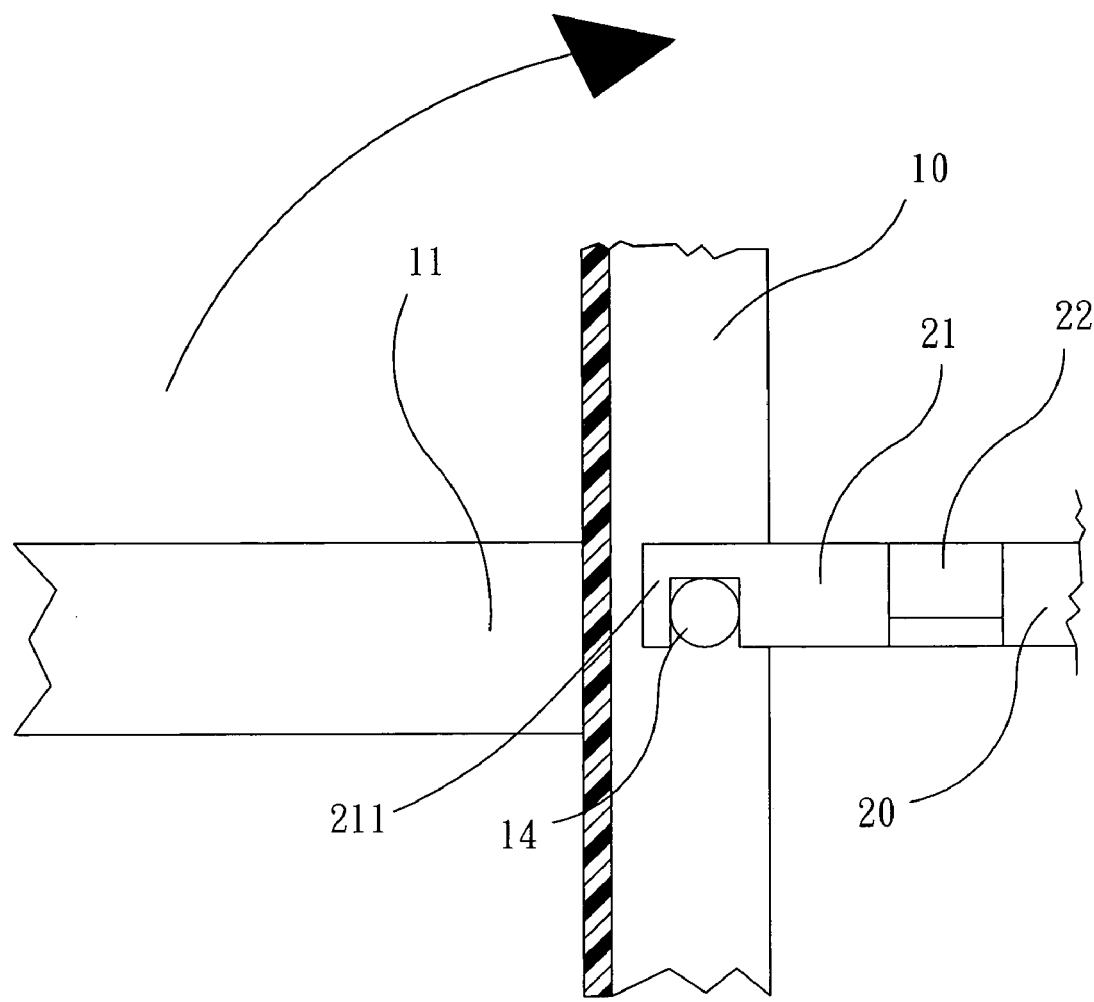
Figure 3C:
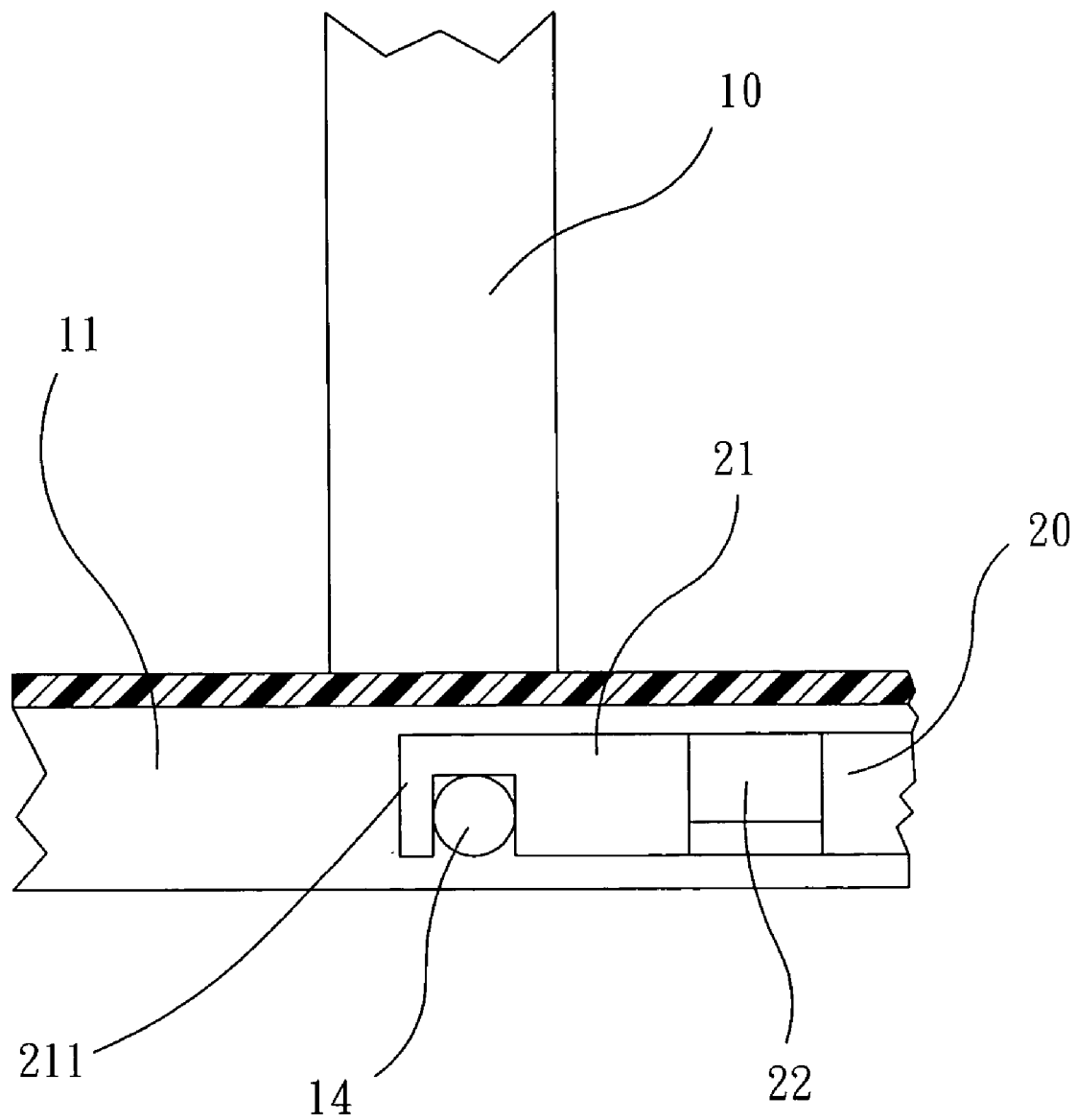
Figure 4A:
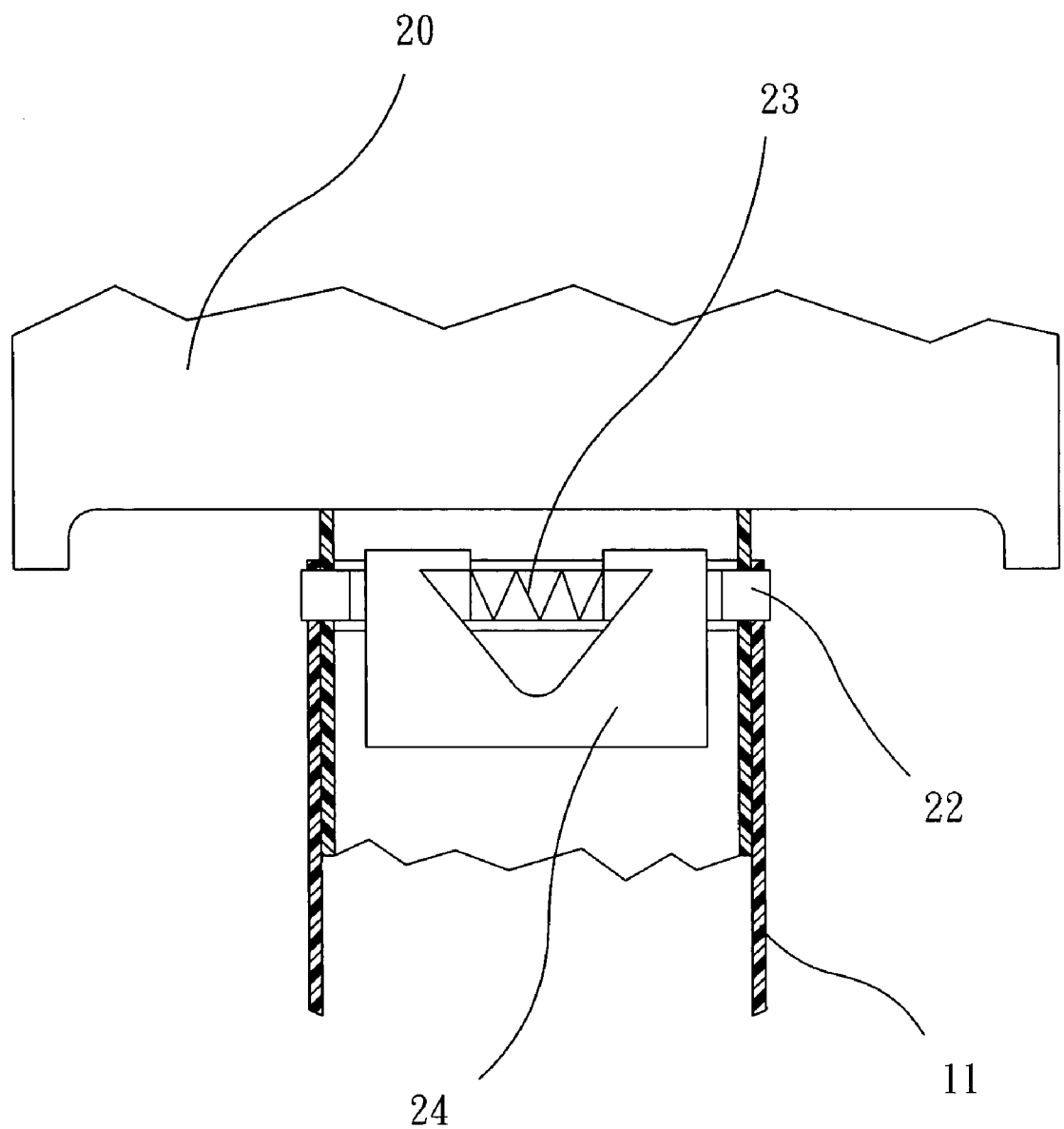
FIGS. 4(A), 4(B) show top views depicting motion of embedding assembly of embed pieces of the treadboard support and fixing holes of the seat mount according to the present invention.
Figure 4B:
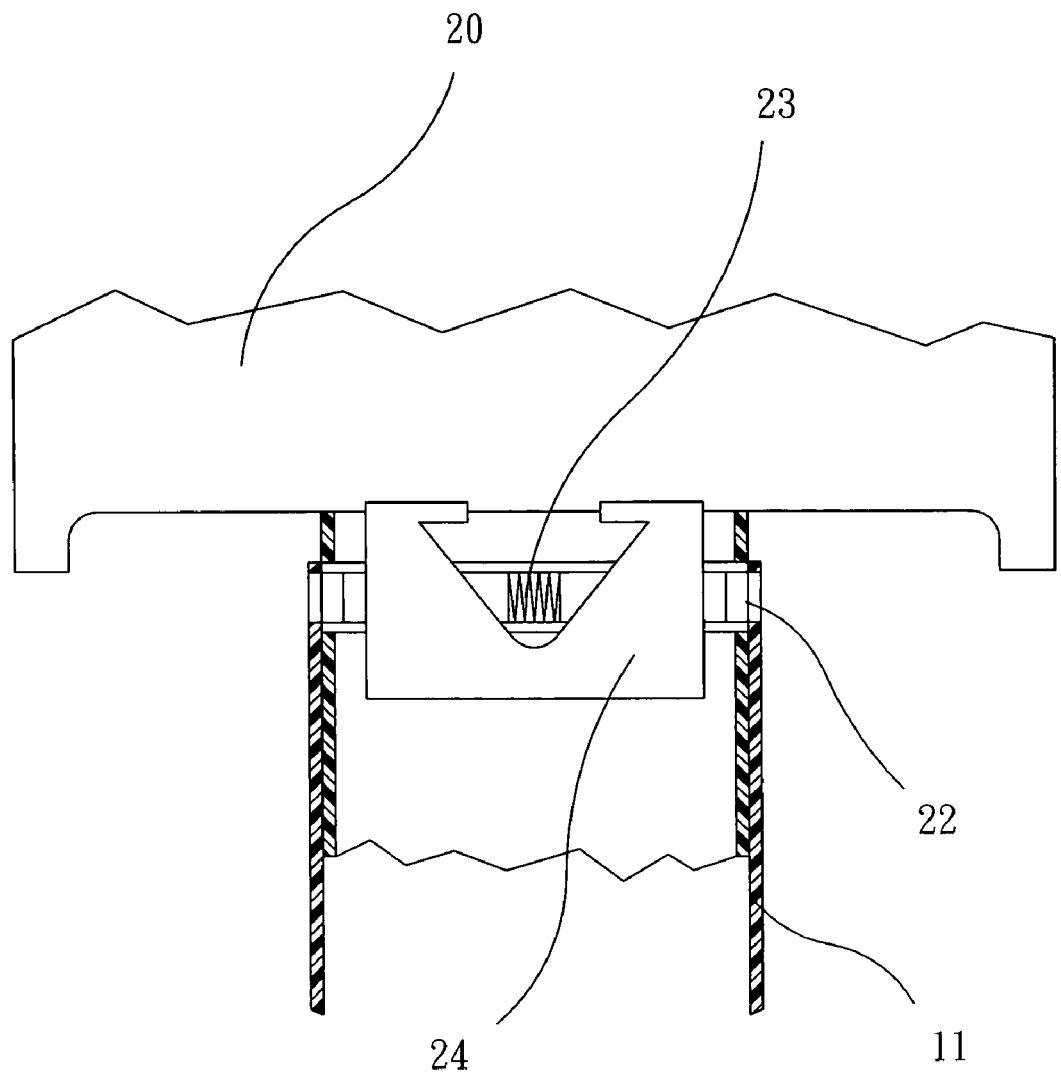

Referring to FIGS. 3A, 3b, 3C, 4A and 4B, which show detailed structural portions of the present invention, wherein FIG. 3A shows assemblage of the treadboard support 20 and the seat mount 10, whereby the hook portions 211 configured on the connecting plate 21 of the treadboard support 20 are first hooked and thereby wedged onto the stud shaft 14 below the joining plate 11 of the seat mount 10. FIG. 3B depicts the completed assemblage, and swinging the seat mount 10 in a clockwise direction about the stud shaft 14 as axis thereby enables a main shaft of the seat mount 10 to assume a vertical position. Whereupon, the embed pieces 22 on the connecting plate 21 of the treadboard support 20, which are initially in a retracted state, as depicted in FIG. 4(A), are instantly subjected to tension of the compression springs 23 and outwardly extend, and thus the embed pieces 22 embed within the fixing holes 13 of the joining plate 11 of the seat mount 10, as depicted in FIG. 4(B), and assemblage of the structural members is thereby completed. Upon wishing to store away the scooter, a user need only press the push plate 24, which presses the embed pieces 22 and forces same to inwardly retract within the square duct 212, thereby releasing restraint of the seat mount 10.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A structural assembly for electric scooter comprising:
   a seat mount, and whereon a joining plate is configured,
      a short slot is defined in a front portion of the joining plate, and a fixing hole is defined in each of two sides of the joining plate, moreover, a stud shaft penetrates an underneath of the joining plate and is configured thereat;

a treadboard support, on an extremity of which is configured a connecting plate, and which is utilized to connectively join with the joining plate of the seat mount, hook portions are configured on a front end of the connecting plate, which can hook onto the stud shaft below the joining plate of the seat mount, a square duct is configured at a linking end of the connecting plate and the treadboard support, and a slot penetrates and is thereby defined in one side of the square duct, structural members of the square duct comprise:

two embed pieces, a compression spring is corresponding fitted on a tail end of each of the embed pieces, and configured so as to be contained interior of each end of the square duct of the connecting plate;

one push plate, which can penetrate the slot defined in the square duct of the connecting plate, and that can embeddedly function in coordination with the two embed pieces;

according to the aforementioned assemblage of structural members, the treadboard support can press and thereby control outward extension or inward retraction of the two embed pieces within the square duct by means of the push plate, and thereby embedding with or release from the seat mount is effectuated, and thus realizes assembly or disassembly of the scooter.

2. The structural assembly for electric scooter according to claim 1, wherein an inclined plane is configuredly formed on one end of each of the embed pieces, and a groove is defined in another end, which allows for containment of the compression springs therein; moreover, a wedge-shaped slot is formed in an upper portion of each of the embed pieces, furthermore, a triangular notch is defined in the push plate, and inclined sides of the triangular notch are so configured to function in coordination with inclined edges of the wedge-shaped slots of the embed pieces, and thus control of extension or retraction of the embed pieces is effectuated by means of sliding coordination of the inclined sides and the inclined edges.

* * * * *